(12) United States Patent
Wang et al.

(10) Patent No.: US 12,395,333 B2
(45) Date of Patent: Aug. 19, 2025

(54) METHOD AND APPARATUS FOR BLOCKCHAIN-AWARE MOBILE VEHICLE COMMUNICATION

(71) Applicant: Lenovo (Beijing) Ltd., Beijing (CN)

(72) Inventors: Haiming Wang, Xicheng District (CN); Xin Guo, Chaoyang District (CN)

(73) Assignee: Lenovo (Beijing) Ltd., Beijing (CN)

( * ) Notice: Subject to any disclaimer, the term of this patent is extended or adjusted under 35 U.S.C. 154(b) by 315 days.

(21) Appl. No.: 18/000,155

(22) PCT Filed: Jun. 16, 2020

(86) PCT No.: PCT/CN2020/096376
§ 371 (c)(1),
(2) Date: Nov. 29, 2022

(87) PCT Pub. No.: WO2021/253231
PCT Pub. Date: Dec. 23, 2021

(65) Prior Publication Data
US 2023/0246853 A1 Aug. 3, 2023

(51) Int. Cl.
*H04L 9/12* (2006.01)
*G06F 9/50* (2006.01)
(Continued)

(52) U.S. Cl.
CPC ............. *H04L 9/12* (2013.01); *G06F 9/5005* (2013.01); *H04L 9/50* (2022.05); *H04W 4/44* (2018.02);
(Continued)

(58) Field of Classification Search
CPC .... G06Q 20/06; G06Q 20/0658; G06Q 40/04; H04L 9/3297; H04L 9/3247; H04L 9/12;
(Continued)

(56) References Cited

U.S. PATENT DOCUMENTS

| 2020/0026712 | A1* | 1/2020 | Madisetti ................. H04L 9/12 |
| 2020/0092085 | A1 | 3/2020 | Baek et al. |
| 2020/0145191 | A1 | 5/2020 | Qi et al. |

FOREIGN PATENT DOCUMENTS

| CN | 109213828 A | 1/2019 |
| CN | 109359973 A | 2/2019 |

(Continued)

OTHER PUBLICATIONS

PCT/CN2020/096376 , "International Preliminary Report on Patentability", PCT Application No. PCT/CN2020/096376, Dec. 29, 2022, 5 pages.

(Continued)

*Primary Examiner* — Kyung H Shin
(74) *Attorney, Agent, or Firm* — FIG. 1 Patents

(57) ABSTRACT

The present application is related to a method and apparatus for blockchain-aware mobile vehicle communication for 3GPP (3rd Generation Partnership Project). A method for wireless communications performed by a user equipment (UE), e.g., a vehicle UE (VUE), includes: receiving configuration information of a blockchain application; transmitting information associated with a candidate block of the blockchain application; and receiving a response related to the candidate block.

17 Claims, 9 Drawing Sheets

(51) Int. Cl.
*H04L 9/00* (2022.01)
*H04W 4/44* (2018.01)

(52) U.S. Cl.
CPC ...... *H04L 2209/80* (2013.01); *H04L 2209/84* (2013.01)

(58) Field of Classification Search
CPC ..... H04L 9/3236; H04L 9/0637; G06F 16/27; G06F 9/5061; G06F 9/5005
See application file for complete search history.

(56) References Cited

FOREIGN PATENT DOCUMENTS

| | | | | |
|---|---|---|---|---|
| CN | 110597634 A | * | 12/2019 | ........... G06F 9/5005 |
| CN | 110765211 A | | 2/2020 | |
| CN | 114791859 A | | 7/2022 | |
| TW | 202031082 A | | 8/2020 | |
| WO | WO-2020215195 A1 | * | 10/2020 | |

OTHER PUBLICATIONS

PCT/CN2020/096376 , "International Search Report and Written Opinion", PCT Application No. PCT/CN2020/096376, Mar. 17, 2021, 6 pages.
20941020.8 , "Extended European Search Report", EP Application No. 20941020.8, Jan. 4, 2024, 11 pages.
"Final Office Action", U.S. Appl. No. 18/000,155, Mar. 28, 2025, 46 pages.
"Foreign Office Action", CN Application No. 202080102141.8, Mar. 15, 2025, 37 pages.

* cited by examiner $T_{LBS}$: Start of Latency Bound $T_{LBE}$: End of Latency Bound T1: End of PoW T2: Time of reserved resource $T_{LBS}$: Start of Latency Bound
$T_{LBE}$: End of Latency Bound
T1: End of PoW
T2: Time of reserved resource

METHOD AND APPARATUS FOR BLOCKCHAIN-AWARE MOBILE VEHICLE COMMUNICATION

TECHNICAL FIELD

Embodiments of the present application generally relate to a wireless communication technology, especially to a method and an apparatus for blockchain-aware mobile vehicle communication for 3GPP (3rd Generation Partnership Project).

BACKGROUND

Vehicle to everything (V2X) has been introduced into 5G wireless communication technology. In terms of a channel structure of V2X communication, a direct link between two user equipments (UEs) is called a sidelink (SL). Sidelink is a long-term evolution (LTE) feature introduced in 3GPP Release 12, and enables a direct communication between UEs in proximity, and data does not need to go through a base station (BS) or a core network.

Next generation mobile communication system, such as B5G (beyond 5G) or even 6G, is expected to become a framework of services, in which data is collected, processed and transmitted in an intelligent manner. To safely share and store data in the framework, compared to centralized trust architecture, decentralized trust is more attractive to adapt to the variety of next generation mobile communication system. The variety of communication system is required by supporting a vast class of user equipment (UE) to utilize services with various quality of service (QoS) or quality of experience (QoE) requirements. A blockchain application is a promising enabler of decentralized trust by leveraging distributed consensus mechanisms, such as, proof-of-work (PoW).

Currently, in a 3GPP 5G, B5G, or even 6G system or the like, details regarding how to adopt a blockchain application in a mobile vehicle communication network has not been specifically discussed in 3GPP technology yet.

SUMMARY

Some embodiments of the present application provide a method for wireless communications. The method may be performed by a UE, e.g., a vehicle UE (VUE). The method includes: receiving configuration information of a blockchain application; transmitting information associated with a candidate block of the blockchain application; and receiving a response related to the candidate block.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a UE.

Some embodiments of the present application provide a method for wireless communications. The method may be performed by an infrastructure node (e.g., a BS or a road side unit (RSU)). The method includes: receiving, from UE, information associated with a candidate block of a blockchain application; and transmitting a response related to the candidate block.

Some embodiments of the present application provide an apparatus for wireless communications. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by an infrastructure node.

Some embodiments of the present application provide a method for wireless communications. The method may be performed by a UE or an infrastructure node (e.g., a BS or a RSU). The method includes: receiving configuration information of a blockchain application; receiving, from a blockchain network node, information associated with a candidate block of the blockchain application; determining whether a verification operation is enabled; and in response to determining that the verification operation being enabled, performing the verification operation.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a UE or an infrastructure node.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8, B5G, 6G, and so on. It is contemplated that along with developments of network architectures and new service scenarios, all embodiments in the present application are also applicable to similar technical problems; and moreover, the terminologies recited in the present application may change, which should not affect the principle of the present application.

Currently, in a 3GPP 5G, B5G, or even 6G system or the like, the motivation for a vehicle network to adopt a blockchain application stems from the following features: on one hand, the vehicle network has a need of secure information sharing to achieve autonomous, connected and intelligent functions; and on the other hand, distinct vehicle network applications are usually confined within their own ecosystem, which makes it difficult to share authenticated information among different applications. The present application takes an integration of a blockchain application into a vehicle network as an example as described below. The issues and solutions provided in the present application can also be suitable for other mobile communication system, such as, a drone network, internet of things (IoT), and so on.

In 3GPP standard documents, 25 use cases for advanced V2X services have been identified and categorized into 4 use case groups: vehicles platooning, extended sensors, advanced driving, and remote driving. To realize these 25 use cases, data measurement, storage and exchange in a secure way is needed among a vehicle UE (VUE) or between a UE and an infrastructure node. A VUE in a blockchain system may also be named as a VUE miner or a miner VUE. An infrastructure node may be a road side unit (RSU), a BS, or a network. An example system model of an integration of blockchain into a vehicle network is illustrated by FIG. 1.

Figure 1:
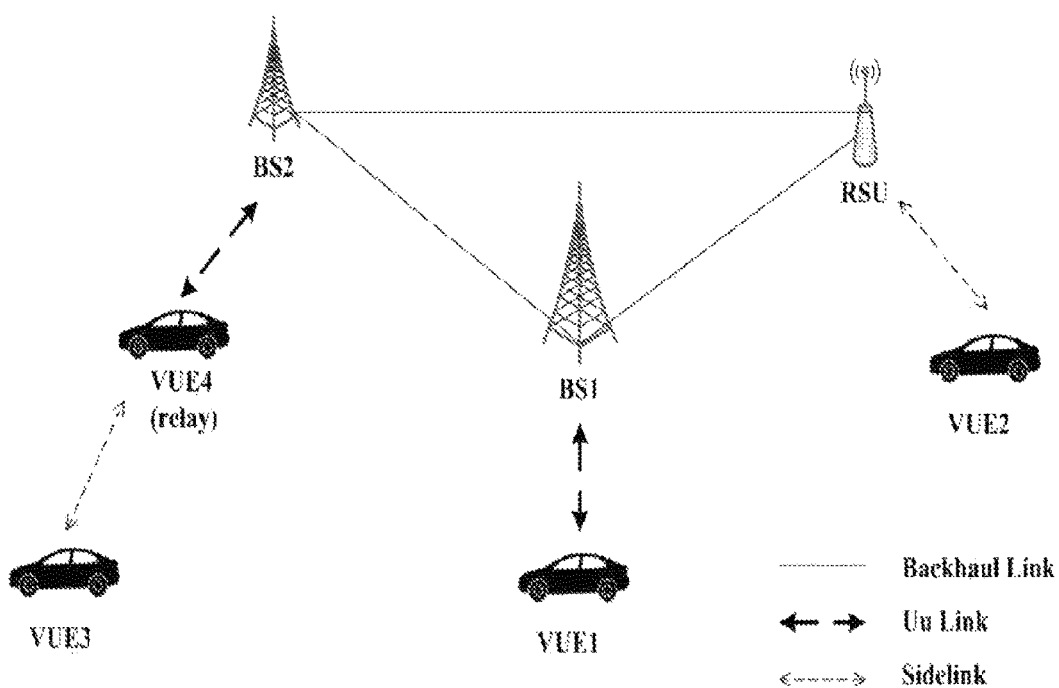
FIG. 1 illustrates a schematic diagram of a vehicle network with an integration of blockchain in accordance with some embodiments of the present application.

FIG. 1 illustrates a schematic diagram of a vehicle network with an integration of blockchain in accordance with some embodiments of the present application.

In particular, the vehicle network with an integration of blockchain in FIG. 1 includes four VUEs (i.e., VUE1, VUE2, VUE3, and VUE4), two BSs (i.e., BS1 and BS2), and one RSU for illustrative purpose. BS(s) and RSU(s) may be named by a joint name "infrastructure node(s)". RSU(s) may be UE-type RSU(s). Although a specific number of VUE(s), and BS(s), and RSU(s) are depicted in FIG. 1, it is contemplated that any number of VUE(s), and BS(s), and RSU(s) may be included in the vehicle network as shown in FIG. 1.

VUE(s) in FIG. 1 may include computing devices, such as, desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present application, the VUE may include a portable wireless communication device, a smart phone, a cellular telephone, a flip phone, a device having a subscriber identity module, a personal computer, a selective call receiver, or any other device that is capable of sending and receiving communication signals on a wireless network.

In some embodiments of the present application, the VUE(s) includes wearable devices, such as smart watches, fitness bands, optical head-mounted displays, or the like. Moreover, the VUE(s) may be referred to as a subscriber unit, a mobile, a mobile station, a user, a terminal, a mobile terminal, a wireless terminal, a fixed terminal, a subscriber station, a user terminal, or a device, or described using other terminology used in the art. The VUE(s) may communicate directly with a BS via LTE or NR Uu interface.

The vehicle network in FIG. 1 may be compatible with any type of network that is capable of sending and receiving wireless communication signals. For example, the vehicle network is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the vehicle network is compatible with the 5G NR of the 3GPP protocol, wherein a BS in FIG. 1 transmits data using an OFDM modulation scheme on the downlink (DL) and the VUE(s) transmits data on the uplink (UL) using a Discrete Fourier Transform-Spread-Orthogonal Frequency Division Multiplexing (DFT-S-OFDM) or cyclic prefix-OFDM (CP-OFDM) scheme. More generally, however, the vehicle network in FIG. 1 may implement some other open or proprietary communication protocols, for example, WiMAX, among other protocols.

In some embodiments of the present application, BS(s) in FIG. 1 may communicate using other communication protocols, such as the IEEE 802.11 family of wireless communication protocols. Further, in some embodiments of the present application, the BS(s) may communicate over licensed spectrums, whereas in other embodiments, the BS(s) may communicate over unlicensed spectrums. The present application is not intended to be limited to the implementation of any particular wireless communication system architecture or protocol. In yet some embodiments of the present application, the BS(s) may communicate with the VUE(s) using the 3GPP 5G protocols.

In particular, the embodiments of FIG. 1 assume VUE1, VUE2 and VUE3 as shown in FIG. 1 act as miner VUEs in the vehicle network with an integration of blockchain. They are categories according to the way how they are connected to infrastructure nodes. The infrastructure nodes comprise BS1, BS2 and RSU, which are connected by backhaul links. VUE1 is directly connected with its serving BS1 via Uu link. That is, VUE1 works in V2X mode 1. VUE2 is connected with UE-type RSU via sidelink. That is, VUE2 works in V2X mode 2. VUE3 is out of coverage of a BS and is connected with VUE4 via sidelink. VUE4 works as a relay to provide a connection between VUE3 and BS2. VUE4 is a relay UE. That is, VUE3 and VUE4 work in V2X mode 2 and V2X mode 1, respectively.

Figure 2:
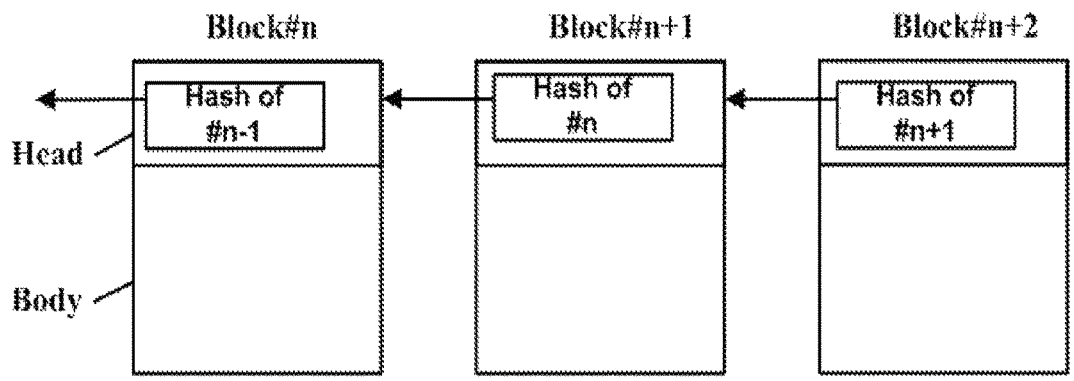
FIG. 2 illustrates an exemplary structure of a blockchain in accordance with some embodiments of the present application.

FIG. 2 illustrates an exemplary structure of a blockchain in accordance with some embodiments of the present application.

The embodiments of FIG. 2 show a basic structure of a blockchain (or ledger). A blockchain may comprise one or more blocks. Each block comprises a block head and a block body. A block head comprises a hash value of the block related to a previous block of the blockchain. A block body contains records of transactions, which is named as data.

As shown in FIG. 2, the blockchain comprise multiple blocks including three blocks, i.e., Block #n, Block #n+1, and Block #n+2. Each of Block #n, Block #n+1, and Block #n+2 comprises a block head and a block body. The block head of Block #n comprises Hash of #n−1, the block head of Block #n+1 comprises Hash of #n, and the block head of Block #n+2 comprises Hash of #n+1, respectively.

Taking a bit coin as an example, a block head of a block has 80 bytes, which comprises 4-byte version number, 32-byte hash value of previous block, 32-byte merkle root hash value, 4-byte timestamp (current time), 4-byte computation difficulty value and 4-byte nonce.

A blockchain may also be named as a ledger or a blockchain application. Running a blockchain in a vehicle network mainly comprises the following steps:
 1. Collecting new data into a candidate block of a blockchain. A candidate block may be named as a new block or an expected block.
 2. Performing PoW computation procedure for the candidate block.
 3. When the PoW computation procedure is finished, the candidate block will be broadcasted to a blockchain network. A blockchain network comprises all network nodes involved in the blockchain as well as the connection among the network nodes. The network nodes may comprise a creation node, a maintenance node, a storage node, a transmission node and so on.
 4. If the candidate block is verified to be valid, it will be accepted as a formal block of the blockchain.
 5. If the candidate block is accepted, it will be stored into the blockchain and will be used as the previous block on which a future formal block will be created and accepted.

In the context of a vehicle network, according to which a node performs the above five steps of running a blockchain, there could be different structures, for example, the following three structures:
 (1) Every node (a VUE and an infrastructure node) takes full operations of the above steps 1-5.
 (2) A VUE collects data and transmits the data to an infrastructure node. The infrastructure node generates a candidate block, performs PoW computation procedure of the candidate block, performs a verification procedure of the candidate block, and stores the candidate block if it is accepted.
 (3) The VUE collects data into a candidate block, processes PoW computation on the candidate block, and then transmits the candidate block to an infrastructure node. The infrastructure node broadcasts the candidate block to other infrastructure node or a node which performs a verification procedure of the candidate block.

The node performs verification can be an infrastructure node, an edge computing node co-sited with the infrastructure node, or other VUE connected to the network. If any VUE wants to update the blockchain or ledger, it can request the information from the infrastructure node.

In the abovementioned structure (3), a VUE owns a computation capability to perform PoW computation; transmission of block, instead of transmission raw data, will greatly reduce using radio resource(s) between a VUE and the infrastructure node; and an infrastructure node can guarantee a stable storage of the blockchain or ledger, compared to a VUE which keeps moving in the vehicle network. However, blockchain forking event(s) may occur in the running blockchain network under the structure (3). Thus, an issue of how to solve forking events intensified by transmission between a VUE and an infrastructure node needs to be solved under the structure (3). Details regarding how to solve this issue have not been defined yet.

Specifically, in a vehicle network with an integration of blockchain, when any miner VUE completes PoW computation, the miner VUE will send a message of the block to an infrastructure node, the infrastructure node will broadcast the message within the blockchain network to reach a node performing verification. Any node to perform verification will verify the first received message. If the block with the shortest PoW latency fails to be the first one to reach the node performing verification, a blockchain forking event occurs. An example of occurrence of forking event can be illustrated by FIG. 3.

Figure 3:
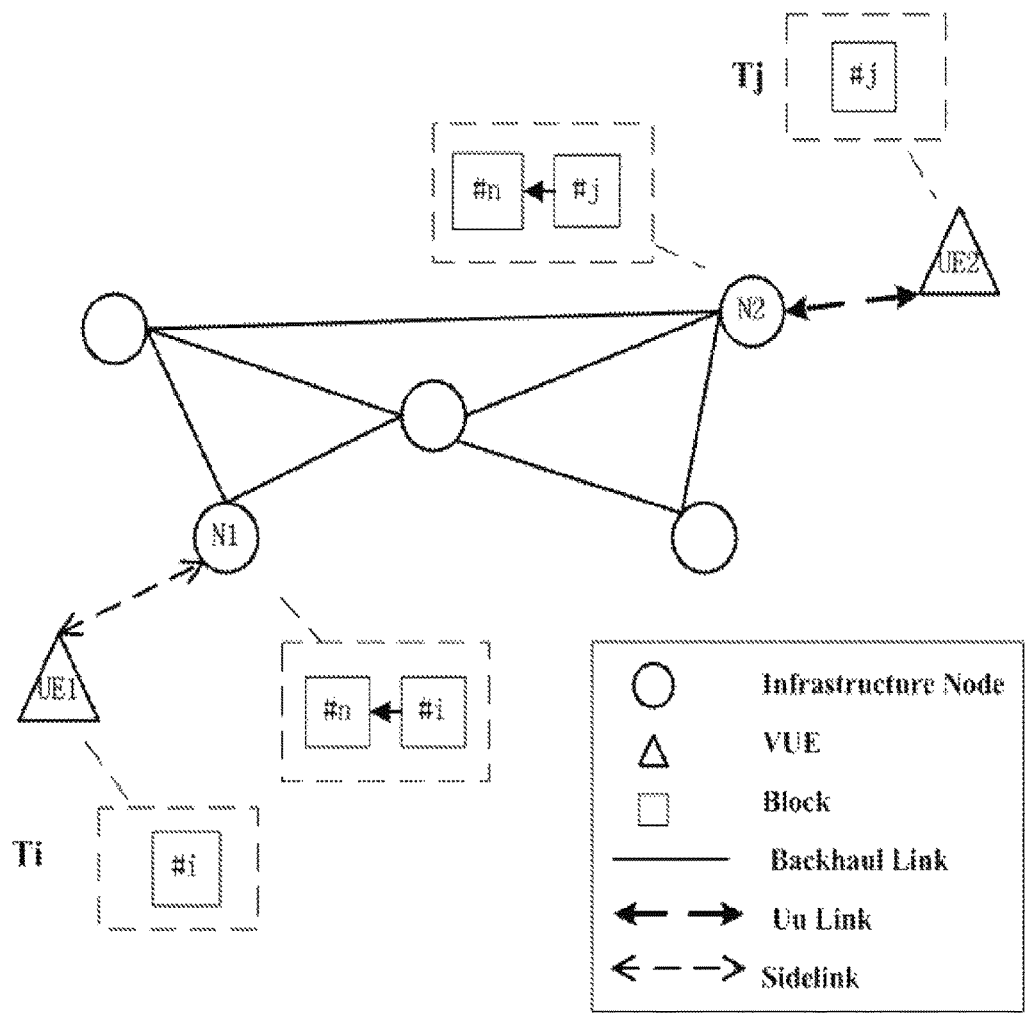
FIG. 3 illustrates a schematic diagram of an occurrence of a forking event in a blockchain network in accordance with some embodiments of the present application.

FIG. 3 illustrates a schematic diagram of an occurrence of a forking event in a blockchain network in accordance with some embodiments of the present application.

The embodiments of FIG. 3 assume that Block #n is the last block in currently unified blockchain (or ledger) in the blockchain network. A candidate block may be denoted as cBlock. The embodiments of FIG. 3 further assume that cBlock #i and cBlock #j are created by different miners of UE1 and UE2, respectively, and both these candidate blocks take Block #n as the previous block during the creation. These two candidate blocks, i.e., cBlock #i and cBlock #j, are created at time Ti and Tj, respectively. Ti and Tj are close to each other, and Ti is earlier than Tj.

As marked in FIG. 3, each of UE1 and UE2 is a VUE and may have the same functions as those of VUE(s) as shown and illustrated in FIG. 1. Each of N1 and N2 is an infrastructure node and may have the same functions as those of BS(s) or RSU(s) as shown and illustrated in FIG. 1.

Due to different transmission delays, different infrastructure nodes may have different perspectives of the blockchain. For example, N1 receives cBlock #i firstly, verifies validity of data in cBlock #i, and links cBlock #i to the blockchain; while N2 receives cBlock #j firstly, verifies validity of data in cBlock #j, and links cBlock #j to the blockchain. Later, when cBlock #i arrives at N2, N2 will have to add the cBlock #i to the link. Since both cBlock #i and cBlock #j take Block #n as the previous block and Ti is earlier than Tj, N2 sees two chains after Block #n. Consequently, a forking event occurs in this case.

However, only one chain of block can be kept as the blockchain. If forking event(s) occurs, the blockchain system must recover it by repeating PoW computation of the forked block, and thus introduces more latency and consumption of computation and energy. Considering distinct connections and channel qualities to the infrastructure node for each miner VUE, the occurrence opportunity of forking event(s) will be greatly increased. Therefore, the present application focuses on solving a problem regarding greatly increase of forking event(s).

Embodiments of the present application aim at speeding up a report of a PoW computation result from a VUE miner to an infrastructure node, and thus decreasing an occurrence opportunity of forking event(s). Some embodiments of the present application provide blockchain-aware resource request and allocation mechanism, in which an indication of block information is transmitted along with a scheduling request for resource from a VUE miner to an infrastructure node. The infrastructure node may determine whether to schedule a resource or not based on the indication and information of other block(s) received from the blockchain network.

Figure 4:
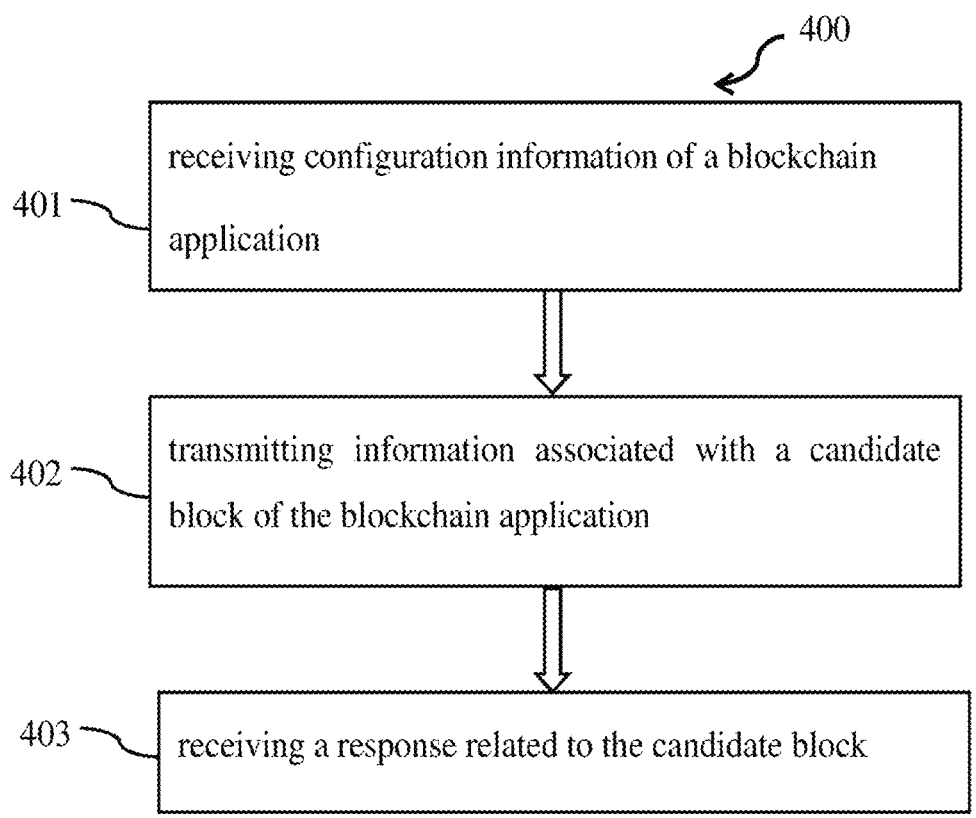
FIG. 4 illustrates an exemplary flow chart of a method for wireless communications in accordance with some embodiments of the present application.

FIG. 4 illustrates an exemplary flow chart of a method for wireless communications in accordance with some embodiments of the present application. The embodiments of FIG. 4 may be performed by a UE or a VUE (e.g., VUE1, VUE2, VUE3 or VUE4 illustrated and shown in FIG. 1).

In the exemplary method 400 as shown in FIG. 4, in operation 401, a UE receives configuration information of a blockchain application. For instance, the UE receives configuration information from an infrastructure node (e.g., a BS or a RSU). In some embodiments, the UE performs PoW computation on a candidate block according to the configuration of the blockchain application.

The configuration information may include latency bound information. A start time of the latency bound information may be an end time of PoW computation of a previous block of the blockchain application. An end time of PoW computation may also be named as a completion time of PoW computation. Alternatively, a start time of the latency bound information may be a start time of the PoW computation of a candidate block. In an embodiment, the UE reserves a resource for transmitting the candidate block, and determines whether to transmit the candidate block using the reserved resource based on the latency bound information that is included in the configuration information received in operation 401.

In an example, only if the following three conditions are satisfied, the UE determines to transmit the candidate block using the reserved resource:
1) when a completion time of the PoW computation of the candidate block is prior to an end time of the latency bound information in the time domain;
2) when the reserved resource is later than the completion time of the PoW computation of the candidate block in the time domain; and
3) when the reserved resource is no later than the end time of the latency bound information in the time domain.

In another example, only if the following two conditions are satisfied, the UE determines to transmit the candidate block using the reserved resource:
1) when a completion time of the PoW computation of the candidate block is no later than an end time of the latency bound information in the time domain; and
2) when the reserved resource is later than the completion time of the PoW computation of the candidate block in the time domain.

In operation 402, the UE transmits information associated with a candidate block of the blockchain application. The information associated with the candidate block may be transmitted using one of uplink control information (UCI), MAC control element (CE), and a physical uplink control channel (PUSCH) transmission.

In some embodiments of the present application, the information associated with the candidate block includes an indication of the candidate block to indicate an existence of the candidate block. The indication of the candidate block can indicate the time when the block PoW computation is finished. For instance, the indication is a timestamp or a time offset. One example of the indication is the timestamp in a block head of the candidate block. However, a full-size timestamp would greatly increase overhead. Another example of the indication can be a time bias or a time offset from the time when the PoW is finished to the time when a scheduling request (SR) is transmitted. In this case, the indication can be expressed, such as, in symbols, slots, or ms.

In some other embodiments of the present application, the information associated with the candidate block includes contents of the candidate block. The contents of the candidate block may also be named as block information of the candidate block or actual contents of the candidate block.

In operation 403, the UE receives a response related to the candidate block, e.g., from a BS or a RSU.

In some embodiments of the present application, the UE transmits a SR for requesting a resource for transmitting the candidate block. In these embodiments, the response received in operation 403 is a scheduling response, and the scheduling response includes a resource allocation result of the candidate block. For instance, if the scheduling response includes a resource allocated for the candidate block, the UE may transmit contents of the candidate block using a resource allocated for the candidate block. If the scheduling response includes no resource, the UE may discard the candidate block.

In some embodiments of the present application, the UE transmits a calibration request of the candidate block, e.g., to an infrastructure node. Then, the UE receives a calibration response of the candidate block, e.g., from the infrastructure node.

In some embodiments of the present application, the UE transmits an update request of the candidate block, e.g., to an infrastructure node. Then, the UE receives an update response of the candidate block, e.g., from the infrastructure node.

Details described in the embodiments as illustrated and shown in FIGS. 1-3 and 5-15, especially, contents related to specific operations of a UE in a blockchain network, are applicable for the embodiments as illustrated and shown in FIG. 4. Moreover, details described in the embodiments of FIG. 4 are applicable for all the embodiments of FIGS. 1-3 and 5-15.

Figure 5:
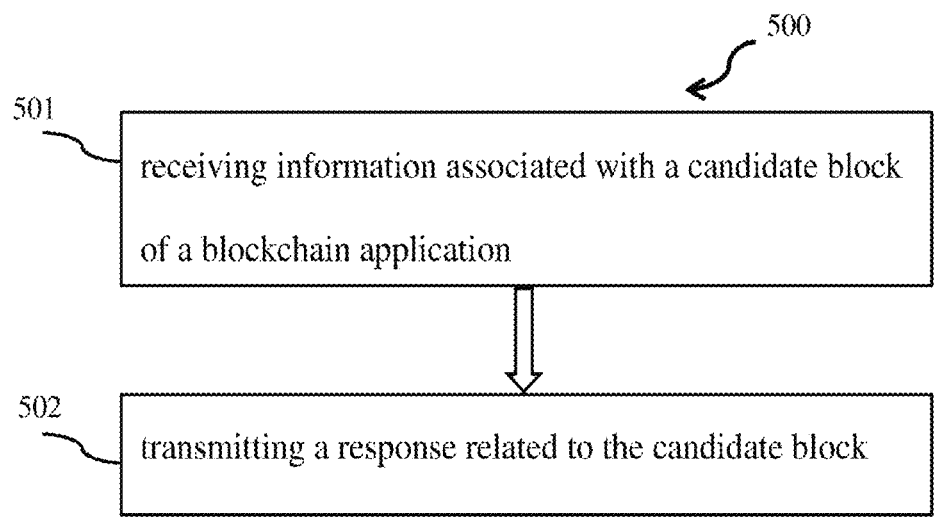
FIG. 5 illustrates a further flow chart of a method for wireless communications in accordance with some embodiments of the present application.

FIG. 5 illustrates a further flow chart of a method for wireless communications in accordance with some embodiments of the present application. The embodiments of FIG. 5 may be performed by an infrastructure node (e.g., BS1, BS2, or RSU illustrated and shown in FIG. 1) or a blockchain network node. A blockchain node may be a BS, a RSU, a UE, and a relay UE.

In the exemplary method 500 as shown in FIG. 5, in operation 501, an infrastructure node receives, from a UE, information associated with a candidate block of a blockchain application. In some embodiments, the information associated with the candidate block includes an indication to indicate an existence of the candidate block. The indication may be a timestamp or a time offset (e.g., time bias).

In some other embodiments, the information associated with the candidate block includes contents of the candidate block. The infrastructure node may further determine whether to broadcast the contents of the candidate block based on the contents of the candidate block as well as information associated with one or more additional candidate blocks of the blockchain application. After determining to broadcast the contents of the candidate block, the infrastructure node may broadcast the contents of the candidate block.

In some embodiments, the UE is a VUE which works in V2X mode 1 or V2X mode 2, and the UE performs PoW computation on the candidate block. In an embodiment, the infrastructure node determines whether the UE is the first equipment to finish PoW computation on the candidate block generated based on an identical block, i.e., the last block in currently unified blockchain (or ledger) in the blockchain network. If the UE is the first equipment to finish the PoW computation on the candidate block, the infrastructure node may determine to broadcast the contents of the candidate block.

In some other embodiments, the UE is a relay UE (e.g., VUE4 illustrated and shown in FIG. 1), and the information associated with the candidate block is received by the relay UE from another UE performing PoW computation on the candidate block. The relay UE may be configured to receive contents of the candidate block from the abovementioned another UE performing PoW computation on the candidate block. The relay UE may be configured to transmit an indication to indicate an existence of the candidate block to the blockchain network. The relay UE may be configured to perform according to the response related to the candidate block and to transmit another response to the abovementioned another UE.

In operation 502, the infrastructure node transmits a response related to the candidate block. In some embodiments, the infrastructure node receives configuration information of the blockchain application before transmitting the response. In an embodiment, the infrastructure node receives a scheduling request (SR) for requesting a resource for transmitting the candidate block and determines a resource allocation result of the candidate block. For example, the resource can be in PUSCH. The response in operation 502 may be a scheduling response, and the scheduling response may include the resource allocation result of the candidate block.

For example, the infrastructure node determines a resource allocation result of the candidate block based on the information associated with the candidate block and information associated with one or more additional candidate blocks of the blockchain application. The information associated with one or more additional candidate blocks may be received from a blockchain network node.

In some embodiments, the infrastructure node generates tentative block information associated with the candidate block based on the indication in the information associated with the candidate block, broadcasts the tentative block information, receives contents of the candidate block on a allocated resource, and broadcasts the contents of the candidate block. For example, the resource can be in PUSCH. In some case, the infrastructure node firstly determines whether the UE is the first equipment to finish PoW computation of the candidate block generated based on an identical block, i.e., the last block in currently unified blockchain (or ledger) in the blockchain network. If the UE is the first equipment to finish the PoW computation of the candidate block, the infrastructure node will generate the tentative block information associated with the candidate block.

The contents in tentative block information are defined and indicated by the blockchain application. The tentative block information may include one or more of the following contents:

a) The time when a PoW computation for the candidate block is finished.
  b) A VUE identification (ID), which could be ID for the VUE in the blockchain application.
  c) An indication to indicate when the corresponding block information will be received. The indication can be a time bias between the time when the tentative information is transmitted and the time when the block information is transmitted from a VUE (or when the block information is received). The indication can be expressed such as in symbols, slots, or ms.
  d) Information of previous block. The information of previous block helps to identify on which block the candidate block is generated. For example, the information of precious block can be full-size sequence number of previous block, partial of sequence number for pervious block, hash value of pervious block, timestamp of previous number, and so on.

In some embodiments, the infrastructure node receives, e.g., from a VUE, a calibration request of the candidate block, calibrates a consistency of the candidate block, and then transmits, e.g., to the VUE, a calibration response of the candidate block.

Details described in the embodiments as illustrated and shown in FIGS. 1-4 and 6-15, especially, contents related to specific operations of an infrastructure node or a blockchain network node, are applicable for the embodiments as illustrated and shown in FIG. 5. Moreover, details described in the embodiments of FIG. 5 are applicable for all the embodiments of FIGS. 1-4 and 6-15. Specific examples of the embodiments of the present application are described in FIGS. 6-14.

Figure 6:
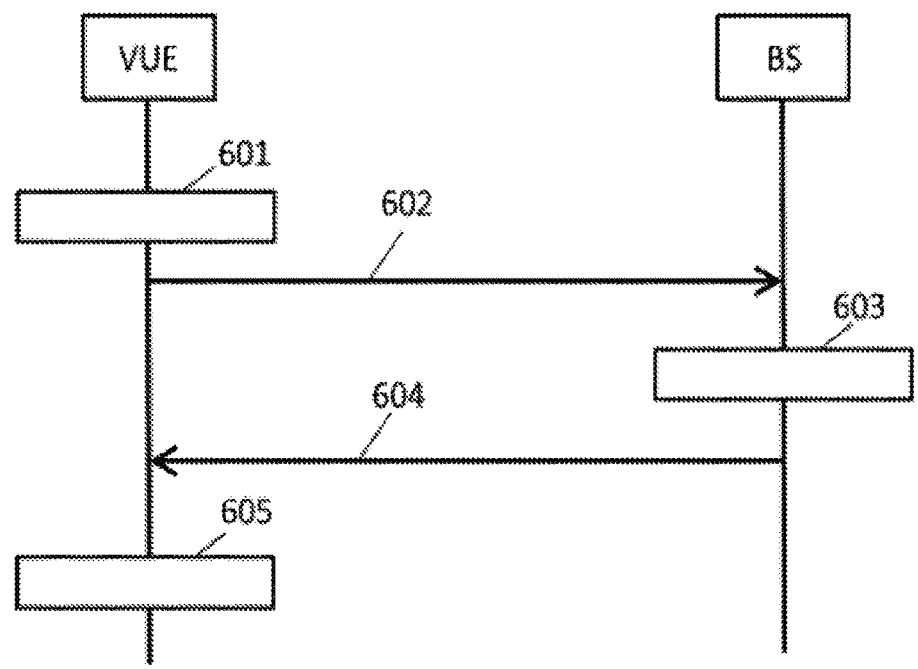
FIG. 6 illustrates a further exemplary flow chart for blockchain-aware mobile vehicle communication in accordance with some embodiments of the present application.

FIG. 6 illustrates a further exemplary flow chart for blockchain-aware mobile vehicle communication in accordance with some embodiments of the present application. The embodiments of FIG. 6 show a signal flow between a VUE (e.g., VUE1 which works in V2X mode 1 illustrated and shown in FIG. 1) and a BS (e.g., BS1 illustrated and shown in FIG. 1).

Figure 13:
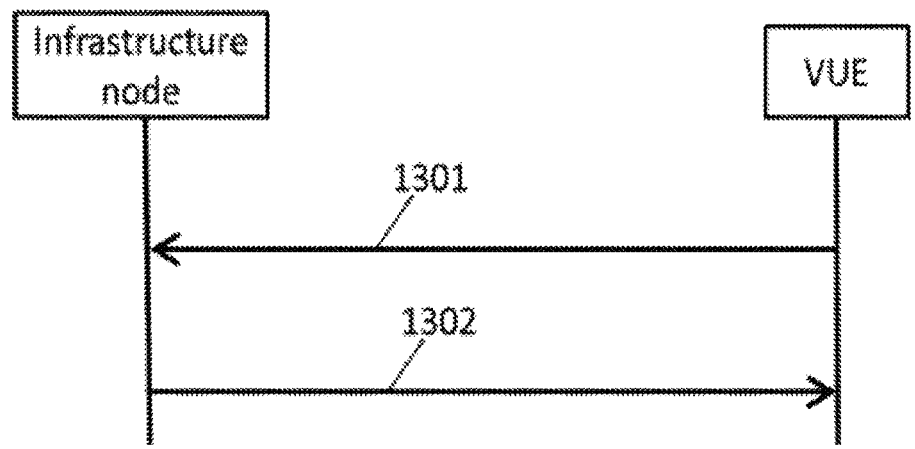
FIG. 13 illustrates an exemplary flow chart for updating a blockchain application in accordance with some embodiments of the present application.

In step 601, when a VUE collects new data required by a candidate block of a blockchain application, the VUE may perform PoW computation on this candidate block. Details regarding the requirement of data, how to collect data, and how to perform PoW computation on a block are defined and indicated by the blockchain application. The PoW computation will have previous block information as input. If the VUE do not have the latest previous block information, the VUE will request the information from a BS. Details are depicted in FIG. 13.

In step 602, when the VUE finishes PoW computation of the candidate block, the VUE may request a resource for uplink data transmission of the candidate block to the BS by sending a SR. For example, the resource can be in PUSCH. The VUE may also send an indication to indicate the existence of the candidate block, along with other information defined in the SR as specified by 3GPP standard documents. The indication can be transmitted using one of uplink control information (UCI) and MAC control element (CE).

In step 603, upon receiving the SR with the indication of candidate block, the BS will determine a resource allocation based on both the indication and information of other candidate block(s) received from the blockchain network. Specifically, there may be the following cases:

If the BS receives no other candidate block information and no other tentative block information from the blockchain network after acceptance of the last block in currently unified blockchain (or ledger) in the blockchain network, the VUE which send the SR will be deemed as the first equipment to finish PoW computation for a candidate block generated based the last block in currently unified blockchain (or ledger) in the blockchain network. The BS will allocate a resource for uplink data transmission to the VUE.

If the BS receives some other block information or other tentative block information of other candidate block(s) from the blockchain network, whereas the information indicates that the VUE is the first one to finish PoW computation PoW for a candidate block generated based on the last block in currently unified blockchain (or ledger) in the blockchain network, the BS will allocate a resource for uplink data transmission to the VUE.

Otherwise, the BS will allocate no resource to the VUE.

Figure 11A:
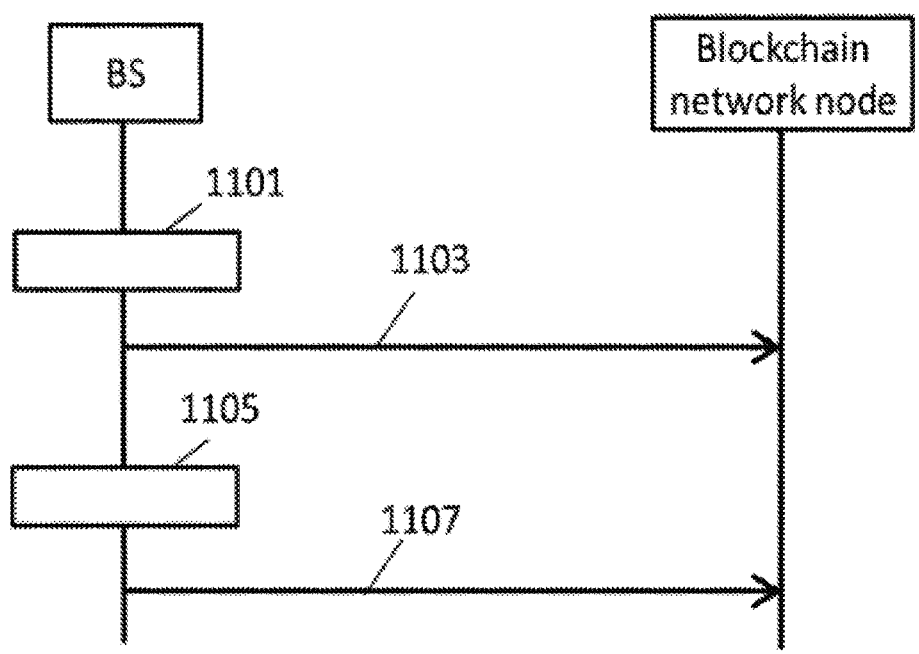
FIG. 11A illustrates an exemplary flow chart for broadcasting blockchain related information in accordance with some embodiments of the present application.
Figure 11B:
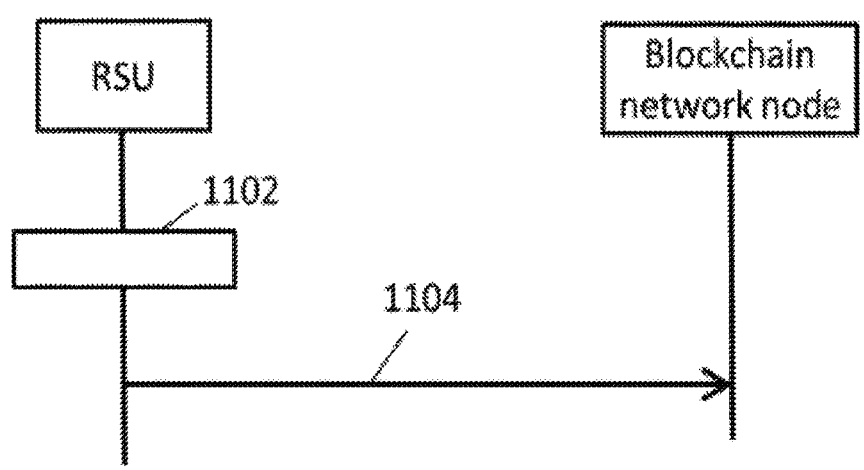
FIG. 11B illustrates a further exemplary flow chart for broadcasting blockchain related information in accordance with some embodiments of the present application.

If the VUE is deemed as the first one to finish PoW computation for a candidate block generated based on the last block in currently unified blockchain, the BS will generate tentative block information for the VUE and broadcast the tentative block information to the blockchain network. Details are depicted in FIGS. 11A and 11B.

In step 604, the BS will send a scheduling response to the VUE to indicate a determination of the resource allocation result. The scheduling response contains a resource allocated for uplink data transmission of the candidate block. Otherwise, the scheduling response indicates no resource allocated for the candidate block.

In step 605, upon receiving the scheduling response, the VUE perform according to the information in the scheduling response. For instance, if the scheduling response contains an allocated resource, the VUE transmit contents of the candidate block to the BS using the allocated resource. Alternatively, if the scheduling response indicates no resource, the VUE will discard the candidate block.

Figure 7:
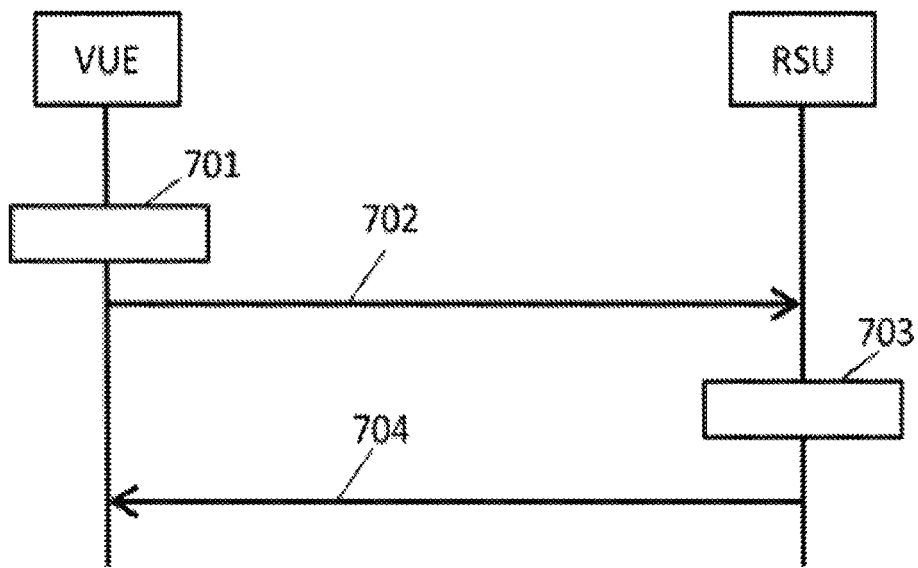
FIG. 7 illustrates another exemplary flow chart for blockchain-aware mobile vehicle communication in accordance with some embodiments of the present application.

FIG. 7 illustrates another exemplary flow chart for blockchain-aware mobile vehicle communication in accordance with some embodiments of the present application. The embodiments of FIG. 7 show a signal flow between a VUE (e.g., VUE2 which works in V2X mode 2 illustrated and shown in FIG. 1) and a RSU (e.g., RSU illustrated and shown in FIG. 1).

In step 701, a VUE collects new data required by a candidate lock and perform PoW computation on this candidate block. In addition, the VUE selects and reserves a resource for transmitting the candidate block.

Figure 8:
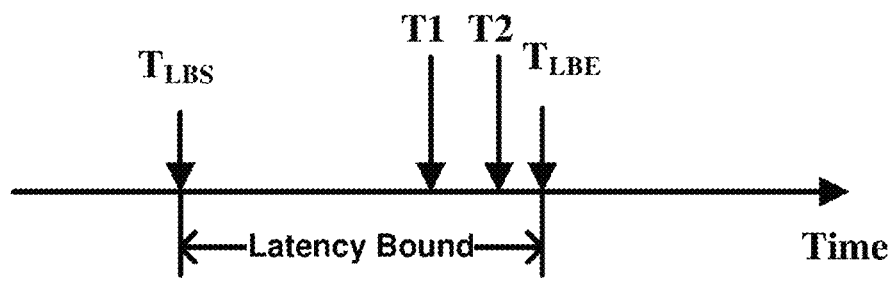
FIGS. 8 and 9 illustrate schematic diagrams of latency bound information in time domain in accordance with some embodiments of the present application.
Figure 9:
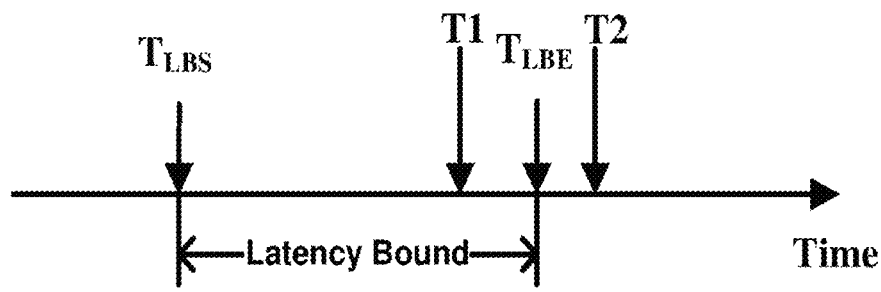

In step 702, the VUE transmits contents of the candidate block to a RSU if certain condition(s) is satisfied. Details are depicted in FIGS. 8 and 9.

In step 703, upon receiving the candidate block from the VUE, the RSU determines to broadcast the candidate block or not based on contents of the candidate block and information of other candidate block(s) received from the blockchain network. Specifically, there may be the following cases:

If the RSU receives no content of other candidate block and no other tentative block information from the blockchain network after acceptance of the last block in currently unified blockchain (or ledger) in the blockchain network, the VUE which sends contents of the candidate block will be deemed as the first one to finish PoW computation for a candidate block generated based the last block in currently unified blockchain (or ledger) in the blockchain network.

If the RSU receives some content of other candidate block(s) or tentative block information of other candidate block(s) from the blockchain network, whereas the information of the candidate block received from the VUE indicates that the VUE is the first one to find PoW for a candidate block generated based on the last block in currently unified blockchain (or ledger) in the blockchain network, the VUE which sends contents of the candidate block will be deemed as the first one to finish PoW computation for a candidate block generated based on the last block.

If the VUE is deemed as the first one to finish PoW computation for a candidate block generated based on the last block, the RSU will broadcast contents of the candidate block to the blockchain network. Details are depicted in FIGS. 11A and 11B.

In step 704, the RSU will send back a response to the VUE to indicate if the candidate block is broadcasted or discarded according to the determination made in step 703.

FIGS. 8 and 9 illustrate schematic diagrams of latency bound information in time domain in accordance with some embodiments of the present application.

The embodiments of FIGS. 8 and 9 show two possible cases in which condition(s) is satisfied for a VUE to transmit contents of a candidate block to a RSU. In these embodiments, condition(s) is that the end time of the PoW computation (i.e., completion time of the PoW computation), denoted by T1, and the time of reserved resource suitable for the block, denoted by T2, are both within a latency bound. The start time of the latency bound is denoted by $T_{LBS}$. The end time of the latency bound is denoted by $T_{LBE}$. The latency bound may be defined and indicated by a higher layer of a VUE.

In one possible case as shown in FIG. 8, the latency bound is defined as that the time of reserved resource for the candidate block (i.e., T2) should not be later than the end of the latency bound ($T_{LBE}$), i.e., T2<=$T_{LBE}$. In this case, to guarantee the candidate block to be transmitted successfully, the end time of the PoW computation should be prior to the time of the reserved resource, i.e., T1<T2. Thus, if the PoW computation can be finished prior to $T_{LBE}$ and suitable resource can be reserved between T1 and $T_{LBE}$, i.e., T1<T2<=$T_{LBE}$, contents of the candidate block can be transmitted by the VUE. Otherwise, the candidate block should be discarded by the VUE.

In another possible case as shown in FIG. 9, the latency bound is defined as that the end time of the PoW computation should be no later than the end of latency bound, i.e. T1<=$T_{LBE}$. In this case, to guarantee the candidate block to be transmitted successfully, the VUE can reserve a resource after the PoW computation is finished, i.e., T1<T2.

Since no constraint is set for T2, T2 can be within the range of T1<T2<=$T_{LBE}$, as shown by FIG. 8, or within the range of T2>$T_{LBE}$, as shown by FIG. 9. Thus, if the PoW computation can be finished no later than $T_{LBE}$ and a suitable resource can be reserved after T1, i.e., T1<=$T_{LBE}$ and T1<T2, contents of the candidate block can be transmitted. Otherwise, the candidate block should be discarded.

Figure 10:
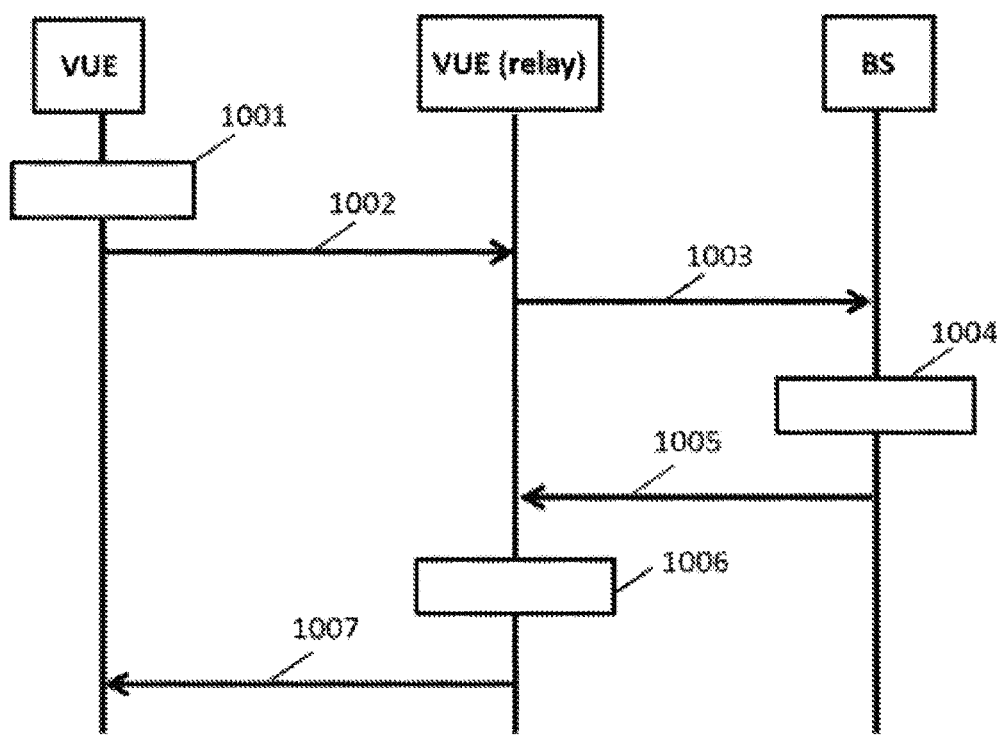
FIG. 10 illustrates yet another exemplary flow chart for blockchain-aware mobile vehicle communication in accordance with some embodiments of the present application.

FIG. 10 illustrates yet another exemplary flow chart for blockchain-aware mobile vehicle communication in accordance with some embodiments of the present application. The embodiments of FIG. 10 show a signal flow between a VUE (e.g., VUE3 which works in V2X mode 2 illustrated and shown in FIG. 1), a relay VUE (e.g., VUE4 illustrated and shown in FIG. 1), and a BS (e.g., BS2 illustrated and shown in FIG. 1).

In step 1001, a VUE (e.g., VUE3 illustrated and shown in FIG. 1) collects new data required by a candidate block and perform PoW computation on this candidate block. In addition, the VUE may select and reserve a resource for transmission of the candidate block. For example, the VUE selects and reserves a resource of a sidelink between the VUE and relay VUE for transmission of the candidate block. Details of this step are the same as those described for step 701 in the embodiments of FIG. 7.

In step 1002, the VUE transmits contents of the candidate block to the connected relay VUE, if certain condition(s) is satisfied. Details of this step are the same as those described for step 702 in the embodiments of FIG. 7.

In step 1003, upon receiving the block, the relay VUE requests a resource for an uplink transmission of the candidate block to a BS (e.g., BS2 illustrated and shown in FIG. 1) by sending a SR. The relay VUE may send an indication to indicate an existence of the candidate block, along with the SR and other information defined for requesting a resource as specified by 3GPP standard documents. Details of this step are the same as those described for step 602 in the embodiments of FIG. 6.

In step 1004, upon receiving the SR with the indication of the candidate block, the BS determines a resource allocation based on both the indication as well as information of other candidate block(s) received from the network. For example, the BS will allocate a resource for uplink data transmission to the relay VUE for transmission of the candidate block. Details of this step are the same as those described for step 603 in the embodiments of FIG. 6.

In step 1005, the BS will send a scheduling response to the relay VUE to indicate the determination of a resource allocation result. For instance, the scheduling response contains allocated resource or indicates no resource allocated for the block transmission. Details of this step are the same as those described for step 604 in the embodiments of FIG. 6.

In step 1006, upon receiving the scheduling response, the relay VUE performs according to information in the scheduling response. If the scheduling response contains an allocated resource, the relay VUE transmits contents of the block to the BS using the allocated resource. If the scheduling response indicates no resource, the relay VUE discards the candidate block. Details of this step are the same as those described for step 605 in the embodiments of FIG. 6.

In step 1007, the relay VUE sends a response to indicate the VUE if the candidate block is transmitted to the BS (i.e., transmitted to the blockchain network) or discarded.

FIG. 11A illustrates an exemplary flow chart for broadcasting blockchain related information in accordance with some embodiments of the present application. The embodiments of FIG. 11A show a signal flow between a BS (e.g., BS1 illustrated and shown in FIG. 1) and a blockchain network node (e.g., any of VUE1, VUE2, VUE3, VUE4, RSU and BS2 illustrated and shown in FIG. 1).

In step 1101, if a VUE is deemed as the first one to finish PoW computation for a candidate block generated based on the last block in currently unified blockchain (or ledger) in the blockchain network, a BS generates tentative block information associated with the candidate block for the VUE. The BS is expected to receive corresponding block information transmitted on the allocated resource. In step 1103, after generating the tentative block information, the BS broadcasts the tentative block information to the blockchain network node immediately. In step 1105, the BS receives contents of the candidate block on the allocated resource. In step 1107, the BS broadcasts the contents of the candidate block to the blockchain network.

FIG. 11B illustrates a further exemplary flow chart for broadcasting blockchain related information in accordance with some embodiments of the present application. The embodiments of FIG. 11B show a signal flow between a RSU (e.g., RSU illustrated and shown in FIG. 1) and a blockchain network node (e.g., any of VUE1, VUE2, VUE3, VUE4, BS1 and BS2 illustrated and shown in FIG. 1).

In step 1102, a RSU receives contents of a candidate block from a VUE. Then, the RSU determines whether to broadcast the contents of the candidate block according to the step 703 in embodiments of FIG. 7. In step 1104, after determining to broadcast the contents of the candidate block, the RSU broadcasts contents of the candidate block to the blockchain network.

Figure 12:
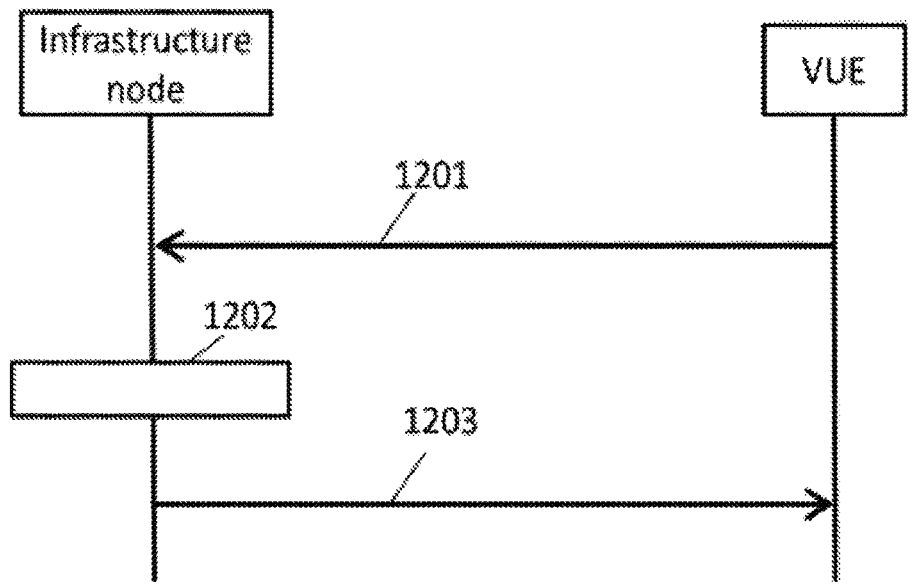
FIG. 12 illustrates an exemplary flow chart for performing consistency calibration of a block of blockchain in accordance with some embodiments of the present application.

FIG. 12 illustrates an exemplary flow chart for performing consistency calibration of a block of blockchain in accordance with some embodiments of the present application. The embodiments of FIG. 12 provide a consistency calibrating procedure of a candidate block performed between an infrastructure node (e.g., BS1, BS2, or RSU illustrated and shown in FIG. 1) and a VUE (e.g., VUE1, VUE2, or VUE3 illustrated and shown in FIG. 1).

In step 1201, if a VUE needs a calibration procedure of its newly accepted block, the VUE may send a calibration request to its serving infrastructure node. As an example, the VUE can be the one which has participated the generation or verification of the newly accepted block and want to verify the consistency of the result. The calibration request can contain a block head of the newly accepted block by the VUE.

In step 1202, upon receiving such a calibration request, the infrastructure node performs a consistency calibration procedure. The calibration procedure can be done by comparing block head(s) of the newly accepted block received from the VUE and the last block in the blockchain of the infrastructure node. There may be the following possible comparing results:

(1) If the comparison indicates that block heads of two blocks are identical, the infrastructure node may set consistency status as "yes" in the calibration response.
(2) If the comparison indicates that two blocks are different, the infrastructure node may calibrate its blockchain with other infrastructure node and send a feedback to the VUE.
  If the block accepted by the infrastructure is right, the infrastructure node will set consistency status as "no" and contain the right block in the calibration response.
  If the block accepted by the VUE is right, the infrastructure node will replace the last block in its blockchain with the right candidate block and set consistency status as "yes" in the calibration response.

In step 1203, the infrastructure node feedbacks the calibration response to the VUE. Upon receiving the calibration response:
  If the consistency status is set as "yes", the VUE does nothing.
  If the consistency status is set as "no", the VUE replaces the last block in its blockchain with the right block contained in the calibration response.

FIG. 13 illustrates an exemplary flow chart for updating a blockchain application in accordance with some embodiments of the present application. The embodiments of FIG. 13 provide an updating procedure of a candidate block or blockchain performed between an infrastructure node (e.g., BS1, BS2, or RSU illustrated and shown in FIG. 1) and a VUE (e.g., VUE1, VUE2, or VUE3 illustrated and shown in FIG. 1).

In step 1301, if a VUE needs information of a block or blockchain, the VUE can send an update request to its serving infrastructure node. As one example, the VUE can be a newcomer for the blockchain network or the one which recovers a connection to the blockchain network. As another example, the VUE can be the one which keeps a connection with the blockchain network but has not participated generation or verification of the block.

In step 1302, upon receiving such a request, the infrastructure node will feedback a response of the newly accepted block or the blockchain, according the request.

Figure 14:
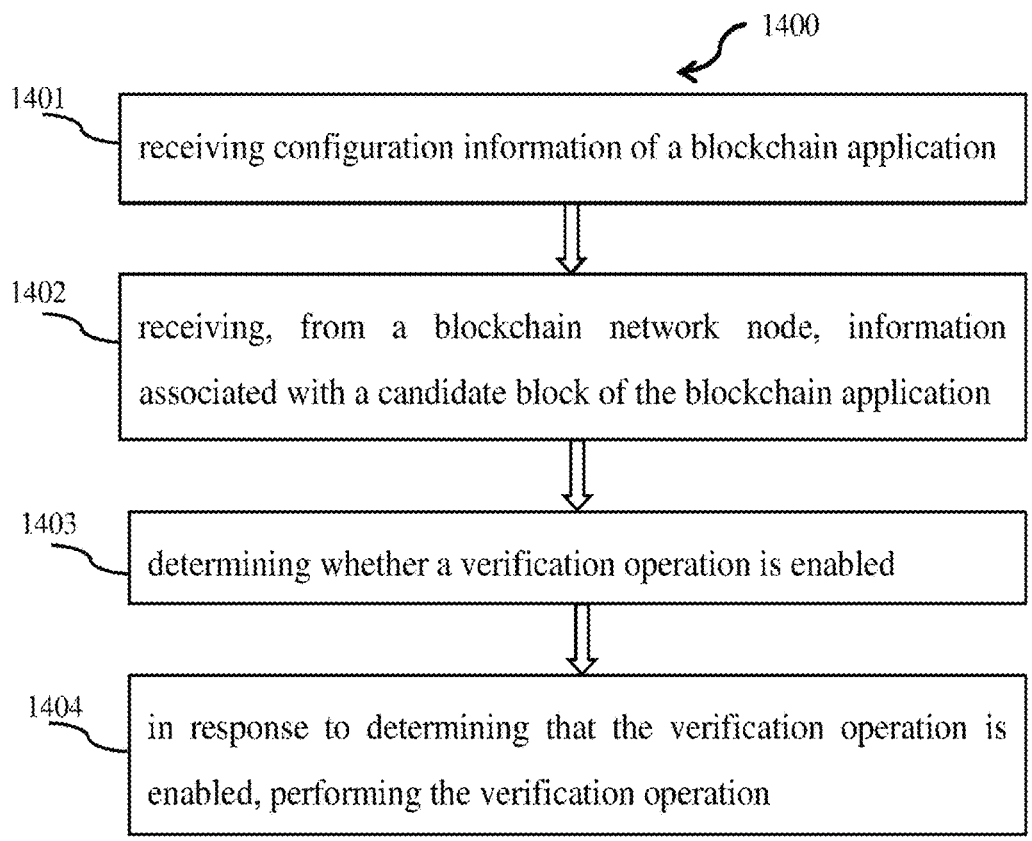
FIG. 14 illustrates a flow chart of a method for verifying a candidate block of a blockchain application in accordance with some embodiments of the present application.

FIG. 14 illustrates a flow chart of a method for verifying a candidate block of a blockchain application in accordance with some embodiments of the present application. The embodiments of FIG. 14 provide a procedure of verification, acceptance and storage of a candidate block performed by a verification node. A verification node can be any blockchain network node, such as, a UE, BS, RSU, and a relay UE.

In the exemplary method 1400 as shown in FIG. 14, in operation 1401, a verification node receives configuration information of a blockchain application.

In operation 1402, the verification node receives, from other blockchain network node, information associated with a candidate block of the blockchain application. In operation 1403, the verification node determines whether a verification operation is enabled. In operation 1404, if the verification node determines that the verification operation is enabled, the verification node performs the verification operation.

In some embodiments, the information associated with the candidate block includes contents of the candidate block. The contents of the candidate block include full-size information of a block including a completion time (i.e., an end time) of PoW computation performed on the candidate block.

In some embodiments, the information associated with a candidate block includes tentative block information associated with the candidate block. The tentative block information associated with a candidate block (e.g., cBlock #i) includes one or more of the following items:
  completion time of PoW computation performed on the candidate block;
  an ID of a UE, wherein the PoW computation is performed by the UE on the candidate block;
  a time offset between time of the blockchain network node transmitting the tentative block information associated with the candidate block and time of the blockchain network node receiving contents of the candidate block; and
  information of a previous block of the blockchain application.

For example, verification may be performed by a blockchain node (e.g., bNode #m) only if both the following trigger conditions are satisfied.
1. when the blockchain node (e.g., bNode #m) is enabled as a verification node. A verification node may be a BS, a RSU, a UE, or a relay UE.
2. when information associated with a candidate block (e.g., cBlock #i) of a blockchain application is received by the node (e.g., bNode #m).

The blockchain node may receive multiple candidate blocks which are generated taking the last block (e.g., block #n) in the blockchain as the previous block. The candidate block (e.g., cBlock #i), which is generated taking the last block in the blockchain as the previous block, is the first one received by the blockchain node, among the multiple candidate blocks.

The information associated with the candidate block can be tentative block information associated with the candidate block or actual contents of the candidate block.

Specific operations of verification on the blockchain node (e.g., bNode #m) include the following steps:
(1) Step 1: a verification node (e.g., bNode #m) keeps receiving information associated with candidate block(s).
  1) The verification node sets up a timer (e.g., timer A) for receiving information associated with one or more additional candidate block(s) (e.g., cBlock #j, #x, #y, and so on) when the verification node determines to perform a verification procedure. The value of the timer is defined and indicated by specific configuration information of the blockchain application.
    The information associated with additional candidate block(s) may include contents of the additional candidate block(s), which include full-size information of a block including a completion time of PoW computation performed on the additional candidate block(s).
    The information associated with additional candidate block(s) may include tentative block information associated with the additional candidate block(s). Items included in the tentative block information associated with the additional candidate block(s) (e.g., cBlock #j, #x, #y, and so on) are similar to those of the tentative block information associated with the candidate block (e.g., cBlock #i).
  2) The verification node adds both information associated with a candidate block (e.g., cBlock #i) and information received during the timer A (e.g., information associated with cBlock #j, #x, #y, and so on) into a list of one or more information units (e.g., a Set of S).
    The list may be initially set as null. Each information unit in the list may include block information of a candidate block or tentative block information associated with a candidate block.
(2) Step 2: the verification node determines which candidate block is acceptable according to the received information associated with candidate block(s), when the timer A is expired.
  1) Step 2.1 The verification node keeps the information associated with one or multiple candidate block(s) which are with the shortest PoW latency and generated taking the last block in the blockchain as the previous block in the Set of S. That is to say, the verification node removes other information from the set of S. For instance, the verification node compares a completion time of PoW computation in each information unit in the set of S, keeps one or more information units with shortest completion time of PoW computation and generated taking the last block in the blockchain as the previous block in the set of S, and removes other information units from the set of S.
  2) Step 2.2 The verification node determines the acceptance of a candidate block according to the following flows:
    P0. Pre-processing: the verification node checks information in the set of S; and if the verification node finds that, for any candidate block, both tentative block information associated with this candidate block and block information of this candidate block are contained in the set of S, the verification node removes the tentative block information from the set of S. For instance, if two information units in the set of S have the same shortest completion time of PoW computation and are generated taking the last block in the blockchain application as a previous block, one information unit contains contents of one candidate block, and the other information unit contains tentative block information associated with the one candidate block, the verification node removes the abovementioned other information unit from the set of S.

P1. If the set of S is null, ending the verification.

P2. If the verification node finds that only one information unit (e.g., block information of one candidate block) is left in the set of S and if the blockchain application requires data validity verification, the verification node verifies validity of the data in this candidate block. If the data is valid, the candidate block is accepted as a formal block of the blockchain; otherwise, the verification node discards the candidate block. Then, the verification is ended.

P3. If multiple information units of block information of candidate blocks are left in the set of S, the verification node may accept the one information unit of them according to a policy defined and indicated by the blockchain application. For example, the configuration information of the blockchain application comprises an accepting policy, and the accepting policy indicates accepting an information unit if the candidate block related to the information unit contains valid data and a maximized amount of data. Then, the verification is ended.

P4. If at least one information unit of tentative block information is left in the set of S, the verification node sets another timer (e.g., timer B) according to the time offset contained in the tentative block information and keeps receiving information associated with further candidate block(s) during the timer B. In particular, before expiry of timer B, the verification node receives information associated with one or more further candidate blocks of the blockchain application or tentative block information associated with the further candidate blocks.

When the timer B is expired, the verification node adds information received during timer B into the set of S, deletes all tentative block information from the set of S, and deletes information unit not generated taking the last block in the blockchain as the previous block. After that, there may be the following cases:

a) If the set of S is null, going to P1 as described above.

b) If only one information unit of block information of a candidate block is left in the set of S, going to P2 as described above.

c) If multiple information units of block information of candidate blocks are left in the set of S, going to P3 as described above.

d) Then, the verification is ended.

Figure 15:
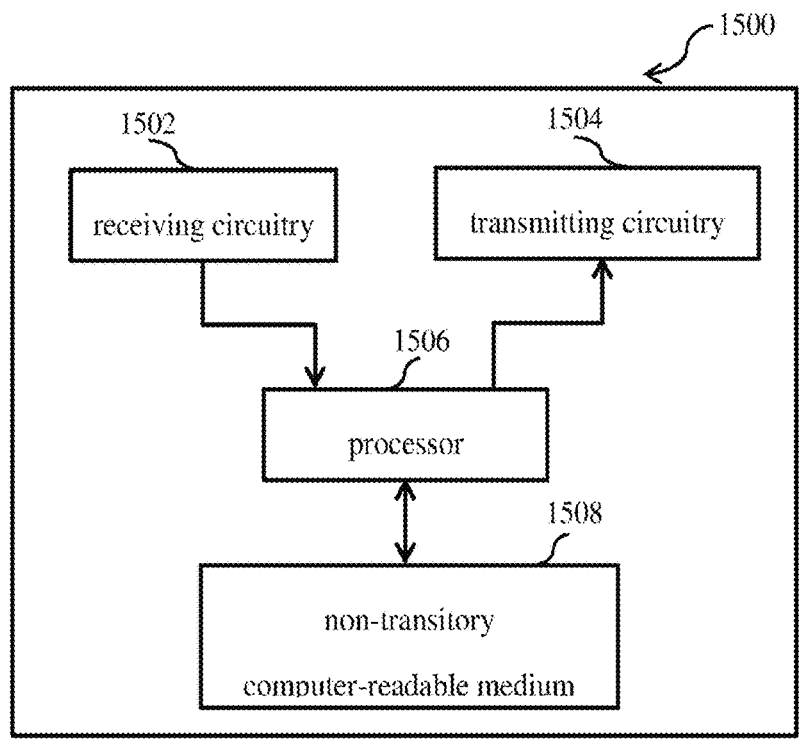
FIG. 15 illustrates a block diagram of an exemplary apparatus in accordance with some embodiments of the present application.

FIG. 15 illustrates a block diagram of an exemplary apparatus in accordance with some embodiments of the present application. Referring to FIG. 15, the apparatus 1500 includes a receiving circuitry 1502, a transmitting circuitry 1504, a processor 1506, and a non-transitory computer-readable medium 1508. The processor 1506 is coupled to the non-transitory computer-readable medium 1508, the receiving circuitry 1502, and the transmitting circuitry 1504.

It is contemplated that some components are omitted in FIG. 15 for simplicity. In some embodiments, the receiving circuitry 1502 and the transmitting circuitry 1504 may be integrated into a single component (e.g., a transceiver).

In some embodiments, the non-transitory computer-readable medium 1508 may have stored thereon computer-executable instructions to cause a processor to implement the operations with respect to UE(s) as described above. For example, upon execution of the computer-executable instructions stored in the non-transitory computer-readable medium 1508, the processor 1506, the receiving circuitry 1502 and the transmitting circuitry 1504 perform the method of FIG. 4, including: the receiving circuitry 1502 receives configuration information of a blockchain application; the transmitting circuitry 1504 transmits information associated with a candidate block of the blockchain application; and the receiving circuitry 1502 receives a response related to the candidate block.

In some embodiments, the non-transitory computer-readable medium 1508 may have stored thereon computer-executable instructions to cause a processor to implement the operations with respect to an infrastructure node (e.g., a BS or a RSU) as described above. For example, upon execution of the computer-executable instructions stored in the non-transitory computer-readable medium 1508, the processor 1506, the receiving circuitry 1502 and the transmitting circuitry 1504 perform the method of FIG. 5, including: the receiving circuitry 1502 receives information associated with a candidate block of a blockchain application; and the transmitting circuitry 1504 transmits a response related to the candidate block.

In some embodiments, the non-transitory computer-readable medium 1508 may have stored thereon computer-executable instructions to cause a processor to implement the operations with respect to a UE or an infrastructure node (e.g., a BS or a RSU) as described above. For example, upon execution of the computer-executable instructions stored in the non-transitory computer-readable medium 1508, the processor 1506, the receiving circuitry 1502 and the transmitting circuitry 1504 perform the method of FIG. 14, including: the receiving circuitry 1502 receives configuration information of a blockchain application; the receiving circuitry 1502 receives information associated with a candidate block of the blockchain application; the processor 1506 determines whether a verification operation is enabled; and in response to determining that the verification operation being enabled, the processor 1506 performs the verification operation.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising".

What is claimed is:

1. A method performed by a user equipment (UE), the method comprising:
   receiving configuration information of a blockchain application;
   performing a proof-of-work (PoW) computation on a candidate block of the blockchain application according to the configuration information;
   transmitting information associated with the candidate block, wherein the information includes a request for a resource for communicating the candidate block based on the configuration information; and
   receiving a response related to the candidate block, wherein the response includes a resource allocation result of the candidate block based on the request, the configuration information, and information of other candidate blocks of the blockchain application, wherein the information of the other candidate blocks indicates that the UE was a first equipment to perform the PoW computation on the candidate block generated based on a last block in a blockchain of the blockchain application.

2. The method of claim 1, wherein the information associated with the candidate block includes one of a timestamp or a time offset to indicate an existence of the candidate block.

3. The method of claim 1, further comprising:
   transmitting a scheduling request (SR) for requesting the resource for transmitting the candidate block.

4. The method of claim 1, wherein the response is a scheduling response that includes the resource allocation result of the candidate block, and the method further comprising at least one of:
   in response to the scheduling response including the resource allocated for the candidate block, transmitting contents of the candidate block using the resource allocated for the candidate block; or
   in response to the scheduling response including no resource, discarding the candidate block.

5. The method of claim 1, wherein the configuration information includes latency bound information, and the method further comprising:
   reserving a resource for transmitting the information associated with the candidate block; and
   determining whether to transmit the information associated with the candidate block using the reserved resource based on the latency bound information.

6. A user equipment (UE) for wireless communication, comprising:
   at least one memory; and
   at least one processor coupled with the at least one memory and configured to cause the UE to:
      receive configuration information of a blockchain application;
      perform a proof-of-work (PoW) computation on a candidate block of the blockchain application according to the configuration information;
      transmit information associated with the candidate block, wherein the information includes a request for a resource for communicating the candidate block based on the configuration information; and
      receive a response related to the candidate block, wherein the response includes a resource allocation result of the candidate block based on the request, the configuration information, and information of other candidate blocks of the blockchain application, wherein the information of the other candidate blocks indicates that the UE was a first equipment to perform the PoW computation on the candidate block generated based on a last block in a blockchain of the blockchain application.

7. The UE of claim 6, wherein the information associated with the candidate block includes one of a timestamp or a time offset to indicate an existence of the candidate block.

8. The UE of claim 6, wherein the at least one processor is configured to cause the UE to transmit a scheduling request (SR) for requesting the resource for transmitting the candidate block.

9. The UE of claim 6, wherein:
   the response is a scheduling response that includes the resource allocation result of the candidate block; and
   the at least one processor is configured to cause the UE to at least one of:
      in response to the scheduling response including the resource allocated for the candidate block, transmit contents of the candidate block using the resource allocated for the candidate block; or
      in response to the scheduling response including no resource, discard the candidate block.

10. The UE of claim 6, wherein:
   the configuration information includes latency bound information; and
   the at least one processor is configured to cause the UE to:
      reserve a resource for transmitting the information associated with the candidate block; and determine whether to transmit the information associated with the candidate block using the reserved resource based on the latency bound information.

11. The UE of claim 6, wherein the at least one processor is configured to cause the UE to:
transmit a calibration request of the candidate block; and
receive a calibration response of the candidate block.

12. An infrastructure node for wireless communication, comprising:
at least one memory; and
at least one processor coupled with the at least one memory and configured to cause the infrastructure node to:
receive, from a user equipment (UE), information associated with a candidate block of a blockchain application, wherein the information includes a request for a resource for communicating the candidate block based on configuration information of the blockchain application; and
transmit a response related to the candidate block, wherein the response includes a resource allocation result of the candidate block based on the request, the configuration information of the blockchain application, and information of other candidate blocks of the blockchain application, wherein the information of the other candidate blocks indicates that the UE was a first equipment to perform a proof-of-work (PoW) computation on the candidate block generated based on a last block in a blockchain of the blockchain application.

13. The infrastructure node of claim 12, wherein the at least one processor is configured to cause the infrastructure node to:
receive a scheduling request (SR) for requesting the resource for transmitting the candidate block; and
determine the resource allocation result of the candidate block.

14. The infrastructure node of claim 12, wherein:
the information associated with the candidate block includes an indication of an existence of the candidate block; and
the at least one processor is configured to cause the infrastructure node to:
generate tentative block information associated with the candidate block based on the indication;
broadcast the tentative block information;
receive contents of the candidate block on an allocated resource; and
broadcast the contents of the candidate block.

15. The infrastructure node of claim 12, wherein:
the information associated with the candidate block includes contents of the candidate block; and
the at least one processor is configured to cause the infrastructure node to:
determine to broadcast the contents of the candidate block based at least in part on a determination as to whether the UE is the first equipment to finish the PoW computation on the candidate block.

16. The infrastructure node of claim 12, wherein the at least one processor is configured to cause the infrastructure node to receive the configuration information of the blockchain application.

17. The infrastructure node of claim 12, wherein the at least one processor is configured to cause the infrastructure node to:
receive a calibration request of the candidate block;
calibrate a consistency of the candidate block; and
transmit a calibration response of the candidate block.

* * * * *